(12) United States Patent
Wu et al.

(10) Patent No.: US 7,516,442 B2
(45) Date of Patent: Apr. 7, 2009

(54) RESOURCE MANIFEST

(75) Inventors: Wei Wu, Redmond, WA (US);
Shenghua Ye, Sammamish, WA (US);
Julie D. Bennett, Medina, WA (US);
Mohammed G. El-Gammal,
Woodinville, WA (US); Frank N. Chu,
Issaquah, WA (US); Sunggook Chue,
Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 10/692,049

(22) Filed: Oct. 23, 2003

(65) Prior Publication Data
US 2005/0108433 A1 May 19, 2005

(51) Int. Cl.
*G06F 9/44* (2006.01)
(52) U.S. Cl. ..................................... 717/120
(58) Field of Classification Search .................. 717/120
See application file for complete search history.

(56) References Cited

U.S. PATENT DOCUMENTS

| | | | |
|---|---|---|---|
| 5,678,039 A | 10/1997 | Hinks et al. | |
| 6,252,589 B1* | 6/2001 | Rettig et al. | 715/703 |
| 6,799,208 B1 | 9/2004 | Sankaranarayan et al. | |
| 6,868,539 B1 | 3/2005 | Travison et al. | |
| 7,007,026 B2* | 2/2006 | Wilkinson et al. | 707/10 |
| 7,152,222 B2* | 12/2006 | Kumhyr et al. | 717/107 |
| 2002/0052910 A1* | 5/2002 | Bennett et al. | 709/104 |
| 2005/0033846 A1 | 2/2005 | Sankaranarayan et al. | |
| 2005/0044205 A1 | 2/2005 | Sankaranarayan et al. | |

FOREIGN PATENT DOCUMENTS

EP        1 315 086        5/2003

OTHER PUBLICATIONS

Java Internationalization: Localization with ResourceBundles by John O'conner Oct. 1998.*
EP Search Report for Appln. No. 04 019 595.0-1243 Jan. 22, 2007.
European Patent Application No. 04 019 595.0 Summons to attend Oral Proceedings dated Oct. 10, 2008.

* cited by examiner

*Primary Examiner*—Wei Y Zhen
*Assistant Examiner*—Junchun Wu
(74) *Attorney, Agent, or Firm*—Joseph R. Kelly; Westman, Champlin & Kelly, P.A.

(57) ABSTRACT

An improved application architecture comprises a bifurcated structure having a language neutral portion and a localizable portion, compacted for efficiency into a smaller set of larger files. This bifurcated structure allows for easier distribution and updating of the application, while the reduced set of files provides for more efficient file management. A resource manifest can be specified during the compile stage to identify elements that are language specific and elements that remain language neutral. Furthermore, additional software can be used after compilation for compacting multiple localizable elements into a single file. Such compacting software can receive inputs specifying the language specific resources which are to be compacted into larger files, and the identity of those larger files. In addition, a file format can be used that can contain multiple language specific resources and can facilitate retrieval and access of individual language specific resources by the relevant language independent code.

16 Claims, 9 Drawing Sheets

RESOURCE MANIFEST

FIELD OF THE INVENTION

This invention relates generally to computer applications and operating systems and, more particularly, relates to a system and method for more efficiently making and using an application or operating system that has functional code and language-neutral data stored separately from localizable User Interface (UI) resources.

BACKGROUND

As computers have become more prevalent around the world, the need for different versions of operating systems or applications optimized or localized for different languages and/or locales has increased, as have the overhead costs associated with producing, updating and maintaining the large amount of such diverse versions. An operating system typically comprises code, data, and language-specific UI resources together in a single binary entity, such that modification of any portion requires an update to the whole. Thus, an update, such as pursuant to a security patch, must be provided for each language of interest. This is referred to as "localization," with each resultant version being referred to as a "localized" version. Since, in the majority of cases when a change is required, the change occurs in the code portion and not the language specific portions, it is wasteful and costly to produce separate localized versions of most fixes, updates, etc. Moreover, when a rapid update response is necessary, such as in issuing a security fix, the delay caused by the need to produce many different specifically localized versions of the fix can leave users unprotected for an unacceptable period of time. Often in such situations, users in low priority locales bear the brunt of the delay since localized versions for higher priority locales are typically produced first.

One solution would be to separate the language independent code and data from language specific data such that modifications, including security patches and the like, could be made only to the language independent code and data. In such a manner, a single security patch could be quickly and efficiently developed and distributed worldwide, and yet still allow the manufacture of localized versions of operating systems and applications unchanged. Such a solution is described in more detail in application Ser. No. 10/435,848, entitled "Bifurcated Operating System Having a Language Neutral Component", filed on May 12, 2003, the disclosure of which is hereby incorporated by reference in its entirety.

Unfortunately, a solution that provides for separate language neutral components and language specific components can quickly result in an unmanageably large number of files for even relatively simple applications that are only being localized for relatively few markets. Even a simple application with approximately 500 component files can require over 5000 corresponding language specific component files only to localize the application for the European market. Such a large number of files can significantly decrease the ability of new versions or patches to be efficiently compiled and distributed. In addition, and more significantly, a large number of files can adversely impact the performance of the application or operating system by requiring two or more files to be loaded: a language neutral file and one or more language specific files. Furthermore, additional resources must be expended to guard large numbers of files against security breaches or other malicious code. Finally, because many modern operating systems allocate virtual memory at a 64 kilobyte granularity and physical memory at a 4 kilobyte granularity, loading a large number of files that are smaller than 64 kilobytes will waste and fragment virtual memory. Files smaller than 4 kilobytes will have a further negative effect as they will impact both virtual and physical memory. It is not uncommon that an operating system will have a non-trivial amount (i.e., greater than 400) of files less than 4 kilobytes in size.

BRIEF SUMMARY OF THE INVENTION

Embodiments of the invention allow for the production of an application or operating system and "fixes" thereto (e.g. patches and updates distributed after the release of the application or operating system) having a language neutral portion relating to the code and non-localizable data and a language specific portion related to the localizable resources used by or made available by the application or operating system. To minimize the number of files corresponding to language specific portions, multiple language specific portions can be stored and accessed from a single file structure.

In an embodiment, a resource tool is provided for combining multiple language specific components into a single binary file. The resource tool can accept a configuration input, specifying which language specific components should be combined in to a single file, and can produce an appropriate combined file.

In another embodiment, a file format is provided for combining multiple language specific components into a single binary file. The file format can provide for access to individual language specific components and maintain the integrity of each of the language specific components.

In a further embodiment, a manifest is adapted to provide language specific resource location services such that code that can make use of language specific resources can locate the appropriate resources, including locating the appropriate file, and the locating the appropriate resource location within the file. In addition, the manifest can provide developers the opportunity to determine and record which resources can be localized and which should remain language neutral. The resource loading is adapted to utilize the manifest when locating and loading resources in an embodiment of the invention.

In a further embodiment, a compiler such as the Windows Resource Compiler (RC.EXE) by Microsoft of Redmond, Wash., is updated to read manifest information and to compile language neutral resources and language specific resources accordingly into separate resource files, e.g. .res files. In this manner, a linker can then link the language neutral resources and language specific resources into separate PE binaries, one for language neutral data and functional code and another for localizable resources. The localizable resources can then be further combined into single or multiple files, providing for increased efficiency in file management services and operation.

Although the description herein focuses primarily on the creation and use of a bifurcated operating system, it will be appreciated that many of the principles and benefits of bifurcation described herein apply as well to applications that are not operating systems. Thus, in further embodiments of the invention, a bifurcated application having a substantially language neutral portion and a localizable portion is contemplated. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
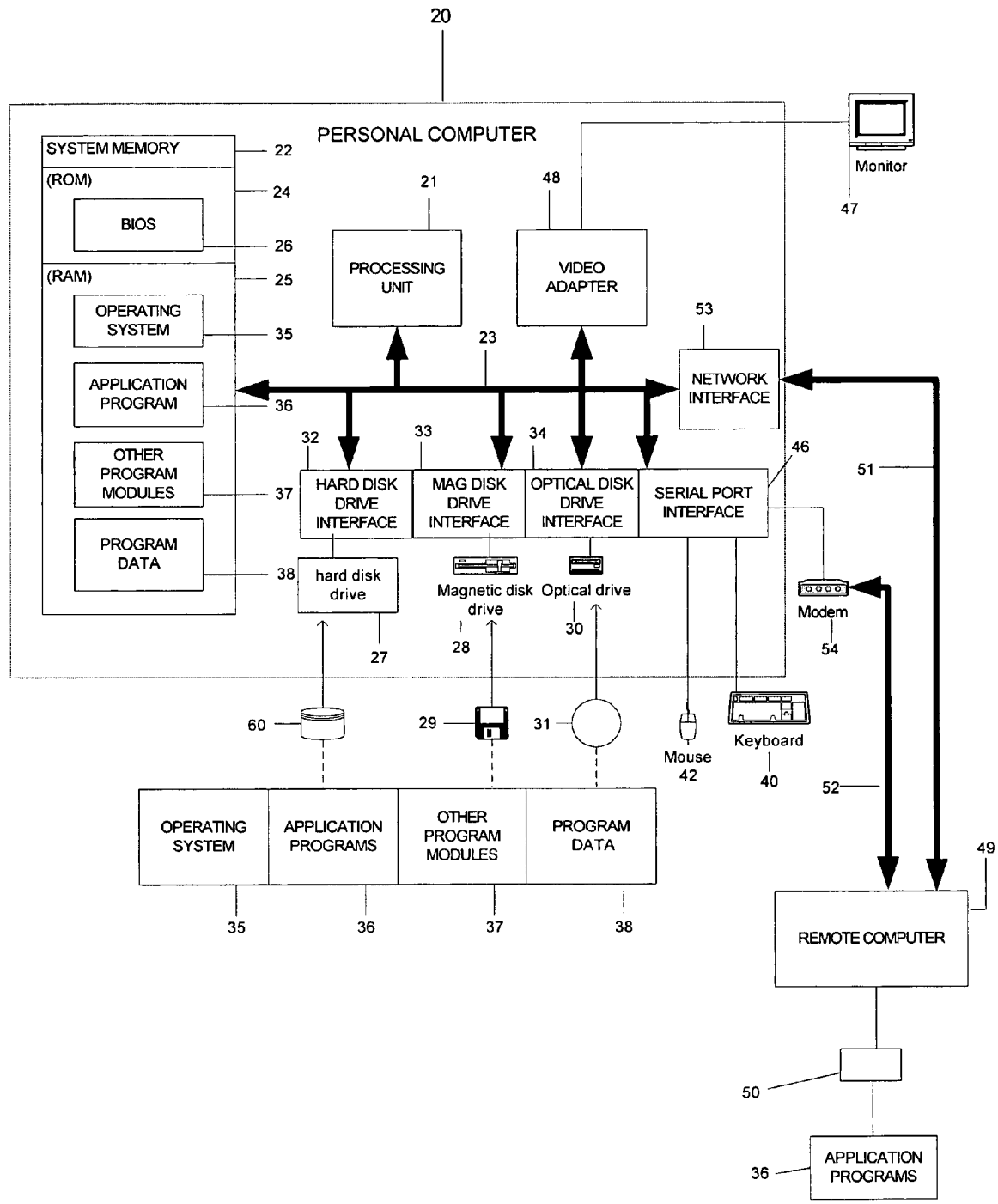
FIG. 1 is a block diagram generally illustrating an exemplary device architecture in which embodiments of the present invention may be implemented.

A number of elements can be used to minimize the quantity of individual language specific files which are distributed with and used by an operating system or application to provide language specific functionality. Initially, a determination can be made regarding the data that can be language specific. For example, dialog boxes presented to the user can be language specific, as can menu choices, or spell check options. Such decisions can be documented in a manifest, that can be compiled, as part of a compilation stage together with the language specific data and the language neutral code and data into one or more object files and resources.

After the compilation stage the object files and resources can be linked together via a linking tool to create portable executable files and individual resource files containing language specific resources and information. A resource tool can combine the multiple language specific files into one or more larger files in such a manner that the individual language specific resources can still be referenced by the language neutral code files and executables. The resource tool can also receive external inputs that can specify the precise language specific files which are to be combined, and identify the resulting larger file or files.

The manner in which various language specific components can be compacted into a single file can include modifications to the compilation stage, such as modifications to a resource compiler, and can include the use of additional software, such as a compacting application, which compacts specified language specific components into a single file using a pre-defined structure, which is designed to enable language neutral code and data to still reference the now-compacted language specific files. The manner in which various language specific components can be compacted into a single file can also include references to resource manifests which specify the relationship between the language neutral code and data and the language specific components, including whether the language specific components will be combined into a single file.

The description below will provide further details regarding the computing environment, the division of code and data into language neutral and language specific components, the compacting of multiple language specific files into a single file, and the information provided to various mechanisms to enable such compacting, including a description of a resource manifest used by these mechanisms.

Computing Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

This description begins with a description of a general-purpose computing device that may be used in an exemplary system for implementing the invention, after which the invention will be described in greater detail with reference to FIG. 2 and subsequent Figures. Turning now to FIG. 1, a general purpose computing device is shown in the form of a conventional personal computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. Program modules depicted relative to the personal computer 20, or portions thereof, may be stored in the remote memory storage device if such is present. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various acts and operations described hereinafter may also be implemented in hardware. Moreover, it will be appreciated that although the description herein focuses primarily on the creation and use of a bifurcated operating system, the bifurcation described herein applies as well to applications.

Separation of Language Dependent Data

Figure 2:
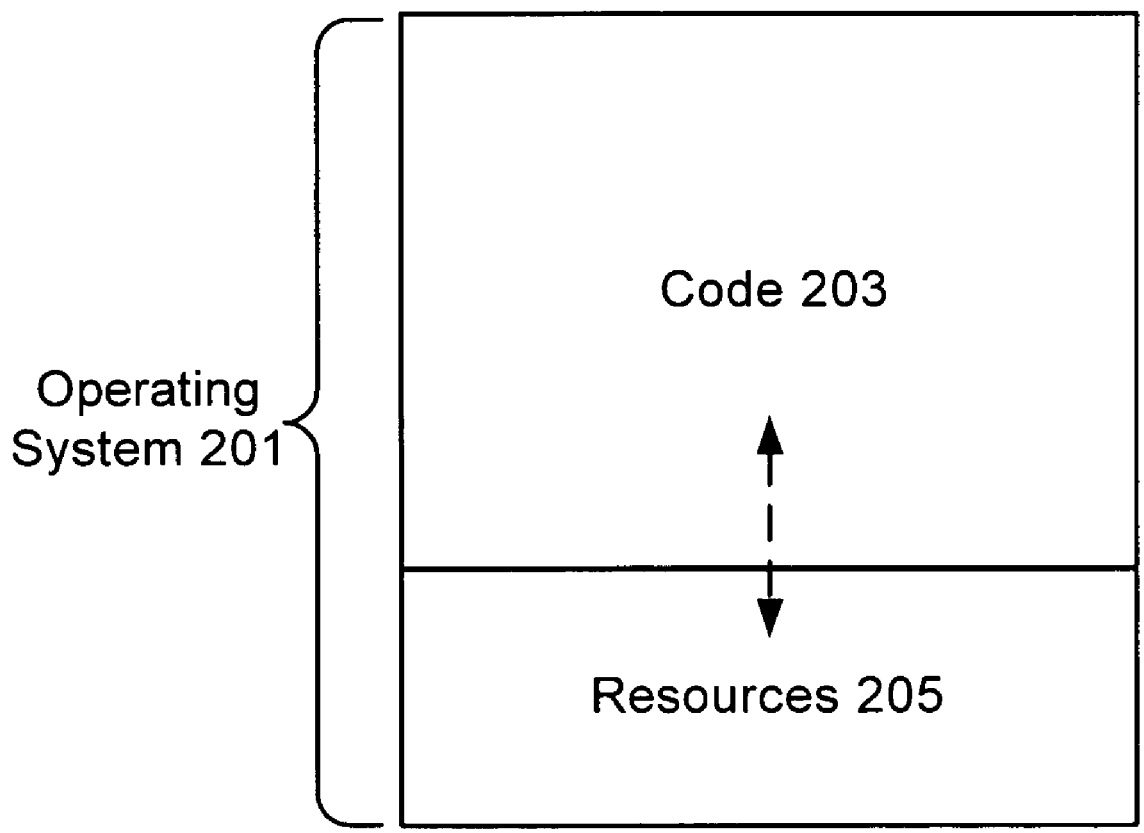
FIG. 2 is an architectural diagram illustrating an existing application binary having a code portion and a resource portion in a single binary.

Turning to FIG. 2, an architectural diagram is shown, illustrating an example of an existing application. In particular, the illustrated application 201 is a mixed single binary comprising code portions 203 and resource portions 205. Such a traditional architecture results in difficulty during an update to either the code portions 203 or the resource portions 205. In particular, the code portions 203 are generally language neutral while the resource portions 205 are generally largely language specific. Most updates after release of an application relate to fixes and patches of the code portions 203 of the application rather than the resource portions 205. Thus, while both the code portions 203 and the resource portions 205 may be altered substantially prior to release, they are changed at significantly different respective frequencies after release.

However, in the example prior architecture, a change to the code portions 203 necessitated changes and reinstallation related to both the code portions 203 and the resource portions 205 in the following manner. First, the appropriate changes to the source code underlying the code portions are made. Next, the new source code and the old resources are combined to generate a new single binary embodying the desired fix. Note that for each language specific version of the resources, a new binary file must be created in this manner. Next, the localized binaries are distributed to the appropriate respective locales. For companies or entities using multiple languages, multiple separate binaries would typically be obtained at this stage. Finally, the updated binaries are installed on the machines (such as personal computer 20 above or other computing device) that require the fix. In locations using multiple languages, an appropriate language fix must be installed for each machine.

Figure 3:
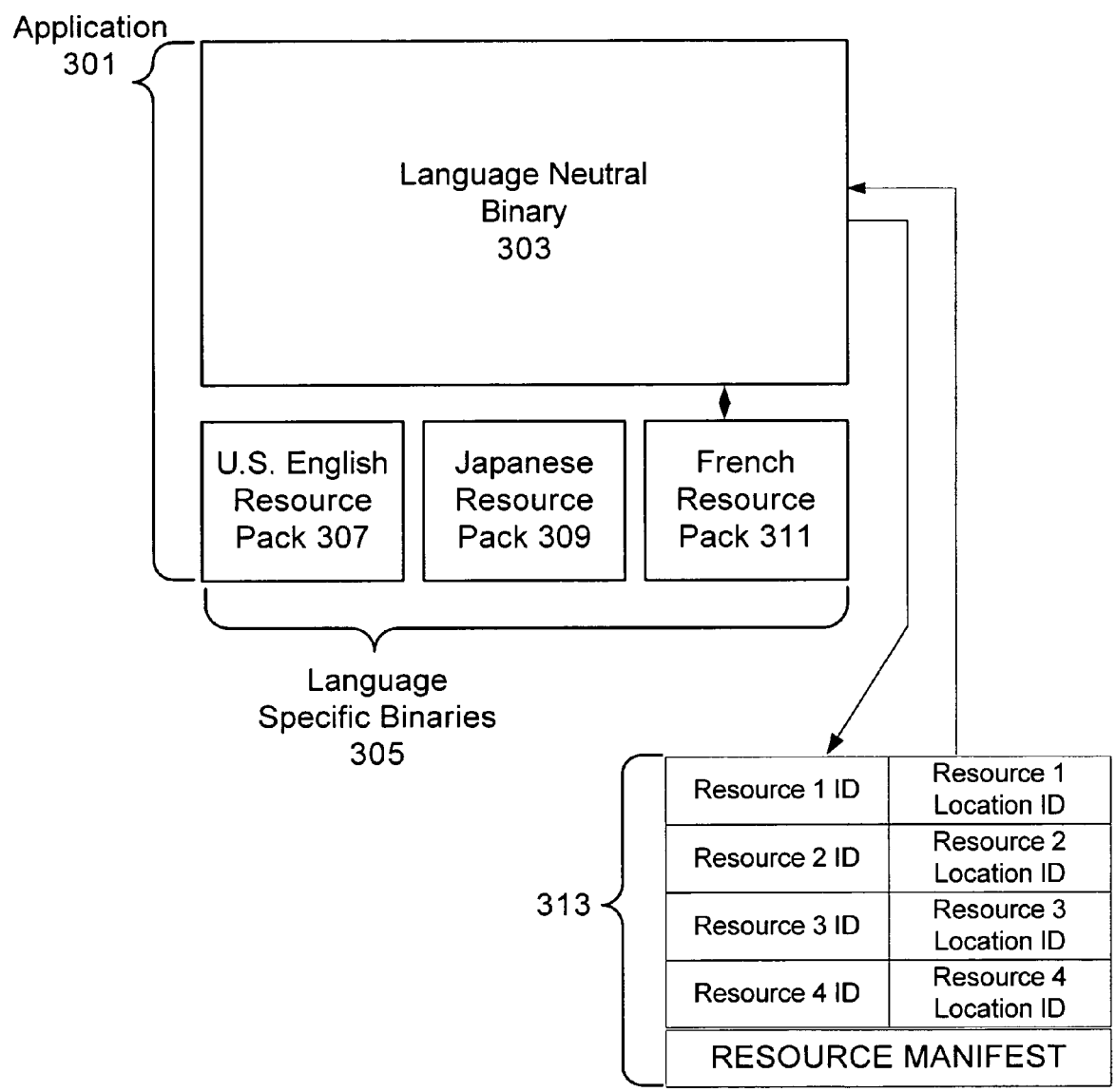
FIG. 3 is an architectural diagram illustrating an application configuration wherein the application has a language neutral code binary portion and a language dependent resource portion in separate binaries.

Referring now to FIG. 3, bifurcated application architecture according to an embodiment of the invention is shown. In particular, an application 301 is shown comprising two separate binaries, a language neutral binary 303 comprising code and language neutral data, and one of the localized or language specific binaries 305. The language neutral binary 303 comprises material that is not localizable, e.g. material that does not need to be translated from one language version of the application to the next. The language specific binary 305 comprises material that is localized, i.e. it is adapted for display in a particular language. Non-exhaustive examples of typically localizable materials include UI text and graphics and application help documentation.

In the illustrated example, the language specific binary 305 is shown comprising multiple resource packs 307, 309, 311 corresponding to U.S. English (307), Japanese (309), and French (311), which is in accordance with an embodiment of the invention, although it is also contemplated that only a single resource pack will be provided with the application in embodiments of the invention, the provided resource pack being matched to the language of the user or purchaser or otherwise selected. It will be appreciated that the specific resource packs illustrated (English, Japanese, and French), are exemplary only, and a resource pack may be provided in any language of interest beyond those specifically shown in FIG. 3. Note that the separation illustrated between localizable and non-localizable resources is preferably embodied not only in system PE binaries (DLL, EXE, OCX, SYS, etc.), but also in any data or other forms of binaries, e.g. XML data, or HTML data.

When installed, the architecture of FIG. 3 includes, according to an embodiment of the invention, a manifest or other record 313 that facilitates location of the appropriate resources by the operating system. In particular, the manifest allows localization by mapping an identifier of a resource to be retrieved to a location of the resource in the appropriate resource pack. For example, the machine on which the application resides may be used by a Japanese user, and may thus have a Japanese resource pack. Preferably, a system setting indicates which resource pack is to be utilized if multiple ones are present. When a resource, such as a dialog box, is to be retrieved, an instantiation of the code portion 303 of the application 301 calls code controlling the manifest 313 with an identifier associated with the desired dialog box. The code controlling the manifest may either forward the call after locating the resource or may instead return an indication of the location to the calling entity.

Compacting Multiple Language Specific Files

On a system, such as the computing system 20 shown in FIG. 1, the installation of a large number of applications, such as application 301 shown in FIG. 3, can result in an unwieldy number of language specific binary files, such as language specific binary files 305. The large number of files can degrade the performance of the computing system 20 by necessitating a large number of file input/output operations each time an application is instantiated. As is known by those skilled in the art, I/O operations are difficult to accelerate, thereby leaving a reduction in the number of I/O operations executed as the most viable option for increasing the efficiency of a computing system. Furthermore, the language specific binary files 305 are generally small, and often smaller than 64 kilobytes in size. Consequently, because many modern operating systems reserve virtual memory in 64 kilobyte increments, the memory usage attributed to the loading of the language specific binary files 305 can be significantly greater than the aggregate size of the language specific binary files, since each file is being loaded into a memory segment that may be much larger than the file itself. Since each file opened in the system takes the system file handle along with other resources, too many opened files in an application can result in degraded system performance as well as increased system wide resource consumption.

Figure 4:
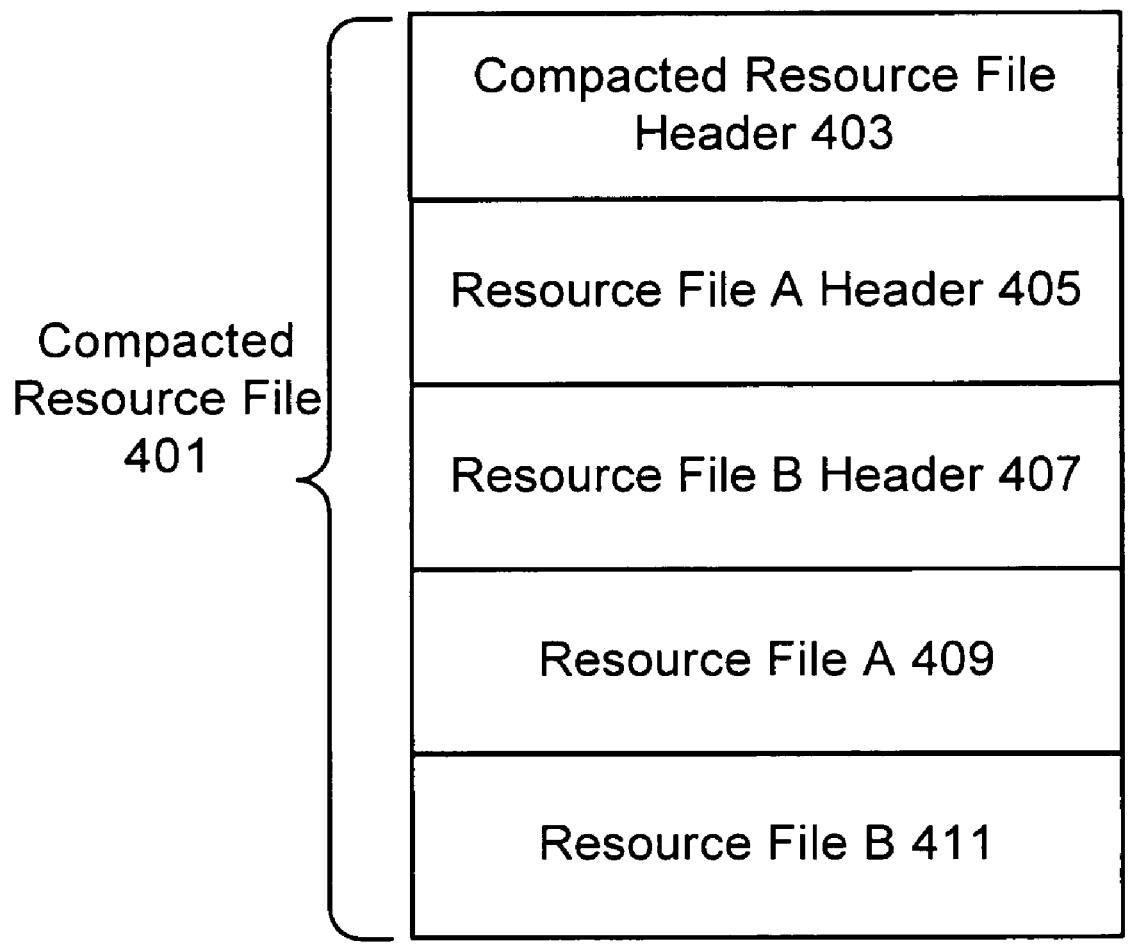
FIG. 4 is an architectural diagram illustrating a file format for a resource compaction scheme according to an embodiment of the invention.

As can be seen, efficiencies due to reduced memory usage and reduced file I/O operations can be realized if one or more language specific binary files 305 were compacted into a single file. Turning to FIG. 4, a compacted resource file 401 is shown containing two resource files, namely resource file A (409) and resource file B (411). Resource files A and B can be any of the language specific binary files 305, such as U.S. English resource pack 407 and Japanese resource pack 409, or they can be the language specific binary files corresponding to multiple applications, where each language specific binary file that is compacted into a single file, such as file 401, corresponds to a particular language. Because a given user is likely to predominantly use only one language, a greater number of file I/O operations can be eliminated if the compacted language specific binary files are all for the same language, and all correspond to different applications. Thus, in a manner to be described further below, if the language specific resources for two or more different applications are contained in the same file, that file need only be loaded once, saving one or more file I/O operations.

The compacted resource file 401 can contain a compacted resource file header 403 that can provide information relevant to the compacted resource file 401 as a whole. For example, the header 403 can contain a signature that can be used to verify that the compacted resource file 401 is, in fact, such a file. Such a signature can begin with a characteristic string to identify file 401 as containing language specific binary files, followed by a global identifier to uniquely identify each compacted resource file. The compacted resource file header 403 can also contain an entry specifying the number of resource files contained in the compacted resource file. Optionally, the header 403 can also specify an offset address for each resource file to uniquely identify the beginning of that resource file within the compacted resource file. For example, header 403 can contain an entry specifying that two resource files, namely resource file A (409) and resource file B (411), are contained within the compacted resource file 401, and header 403 can also specify that resource file A (409) begins at a memory location 512 bytes from the beginning of file 401 and that resource file B (411) begins at a memory location 8096 bytes from the beginning of file 401. Alternatively, the individual resource addresses contained in the header 403 can be any type of index to the beginning of the contained resource file 409 and 411, without being an actual memory offset identifier. The compacted resource file header 403 can also specify the size of the header 403 and the size of the compacted resource file 401 to aid other processes when reading the header 403 or loading the file 401 into memory.

Each resource file that is contained within the compacted resource file 401 can have its own header to provide relevant information regarding that resource file. This header information can immediately follow the compacted resource file header 403 in the compacted resource file 401, as shown in FIG. 4. The resource file headers in FIG. 4, such as resource file A header 405 and resource file B header 407, are located adjacent to one another to facilitate loading of file 401. In an alternative embodiment, the headers 405 and 407 can be located adjacent to their respective resource files, such as files 409 and 411. The resource file headers can contain the file name of their respective resource files, and can also contain the version of the resource file, and a checksum to provide information by which loading software can ensure that the proper resource is being loaded. In one preferred embodiment, the checksum is an MD5 resource checksum. The resource file header can also specify the size of the header and the size of the resource file to aid other processes when reading the resource file header or loading the resource file into memory.

If the location of the resource file, such as resource file 409, within the compacted resource file 401 was not specified in the compacted resource file header 403, then the resource file header, such as header 405, can contain the location of the individual resource file to which it relates. Again, as above, the location information can be an actual memory offset, such as from the beginning of file 401, or it can be any other index to the resource file. Because certain operating systems or other loading mechanisms may require that the starting memory address of a resource be an even number, padding can be used between resources, such as between resource file A (409) and resource file B (411). In such an event, the resource file header, such as header 405, can indicate the existence of the padding, and can even specify the length of the padding.

The resource file, such as resource file A (409) or resource file B (411) can primarily contain the resource data itself. However, additional information can also be contained in the resource file to aid the system that loads or requests the file. For example, the resource file can contain a signature, similar to the signature of the file 401 described above. Additionally, the resource file can contain a resource checksum that can be used to validate the resource file if the version information contained in the resource header, as described above, is different than the version of the requesting application. The resource file can also contain information to aid in finding an appropriate resource, if it is determined that the current resource file is not the proper resource.

The architecture of the compacted resource file 401 allows for multiple resource files to be contained within a single file structure, reducing the number of file I/O operations and increasing the efficient utilization of memory. Various strategies can be used to ensure that the resource files that are most likely to be used together are stored within a single compacted resource file. For example, application 301 can be a component of a larger application. In such a case, application 301 would likely be instantiated with the other components that comprise the larger application. Therefore, a single compacted resource file containing the U.S. English resource pack 307 and the U.S. English resource packs of the other components that comprise the larger application would be the only language-specific resource file that would need to be loaded into memory, and yet each of the multiple components would have access to their respective language-specific resources. Similarly, if application 301 were an operating system file, a single compacted resource file containing resource pack 307 and the equivalent resource packs of other operating system files generally loaded with application 301 would also be the only resource that would need to be loaded into memory to provide the language specific resources to all of the operating system files loaded with application 301. As can be seen, greater efficiencies can be obtained if the resource files, such as resource files 409 and 41 1, that are compacted into the compacted resource file 401 are language specific files for the same language and if those language specific files correspond to applications, including components and system files, that are generally instantiated or used together.

There also can exist applications that may not be related to other components or files such that those components or files would be used at the same time as the application. In such a case, rather than allowing that application's language specific resource files to exist as individual files, such language specific resource files can be compacted with any other language specific resource file in such a manner that the compacted resource file is 64 kilobytes, or a multiple of 64 kilobytes. Because, as was explained above, operating systems often will load files into memory segments of 64 kilobytes in size, compacting multiple resources that are each smaller than 64 kilobytes into a compacted file of 64 kilobytes, or slightly smaller, does not result in any additional memory usage. Conversely, there is a chance that the compacted resource file will save at least one file I/O operation, because there always exists the possibility that another resource compacted into the compacted resource file will be called while the compacted resource file is still loaded in memory. Therefore, it is generally beneficial to compact multiple resource files, such as language specific resource files, into one or more compacted resource files.

Resource Manifest

As previously discussed, user interface resources are increasingly stored in external satellite resource files to facilitate language neutrality. This bifurcated storage scheme can add to the complexity of locating external resources and raises the need to identify the resources which are localizable. Thus, a further aspect of the present invention discloses a system and method to allow developers to control how and what resources should be localized and also gives system necessary information on resource file location, version, checksum, etc. As a result, the application program executable binary's building process can create correct language neutral images and the resource loader can efficiently bind external resources for the module which requests resources at runtime.

To create a close tie between the programming code and its resources, the previously described resource manifest can be employed. In the present invention the resource manifest is a public format which allows component owners to describe resource information such as resource versioning, file paths, and resource types and items. In one preferred embodiment, a declarative Extensible Markup Language (XML) based scheme allows developers to describe a localized or language specific resource file and its related resource information, as well as control resource localizability. Tools and processes can then be developed to build the resource manifest into binaries as embedded data in a format to allow the resource manager to efficiently and accurately track component resource information.

The resource manifest takes two forms, a source form and binary form. In its source form the resource manifest is a XML based declarative source file that accompanies the component's source code. In its binary form the resource manifest is a new resource type with a binary format that can be embedded into the component binary's resource section. From the source form perspective the resource manifest can give the component owner control over how resources should be handled by the build and localization process, as well as run-time resource loading. From the binary form perspective the resource manifest allows the resource loader to have more direct and accurate resource information, thus greatly reducing the need for extra resource fallback searches in the resource loader and thereby improving overall resource loader and management performance. The resource manifest also allows for describing more powerful localizable information such as localized resource types, localized resource items of a given resource type, location, and language which improves resource management. It should be noted though that the resource manifest is not mandatory at the source level—if the resource manifest does not exist in the source a default one can be obtained during the build process.

Figure 5:
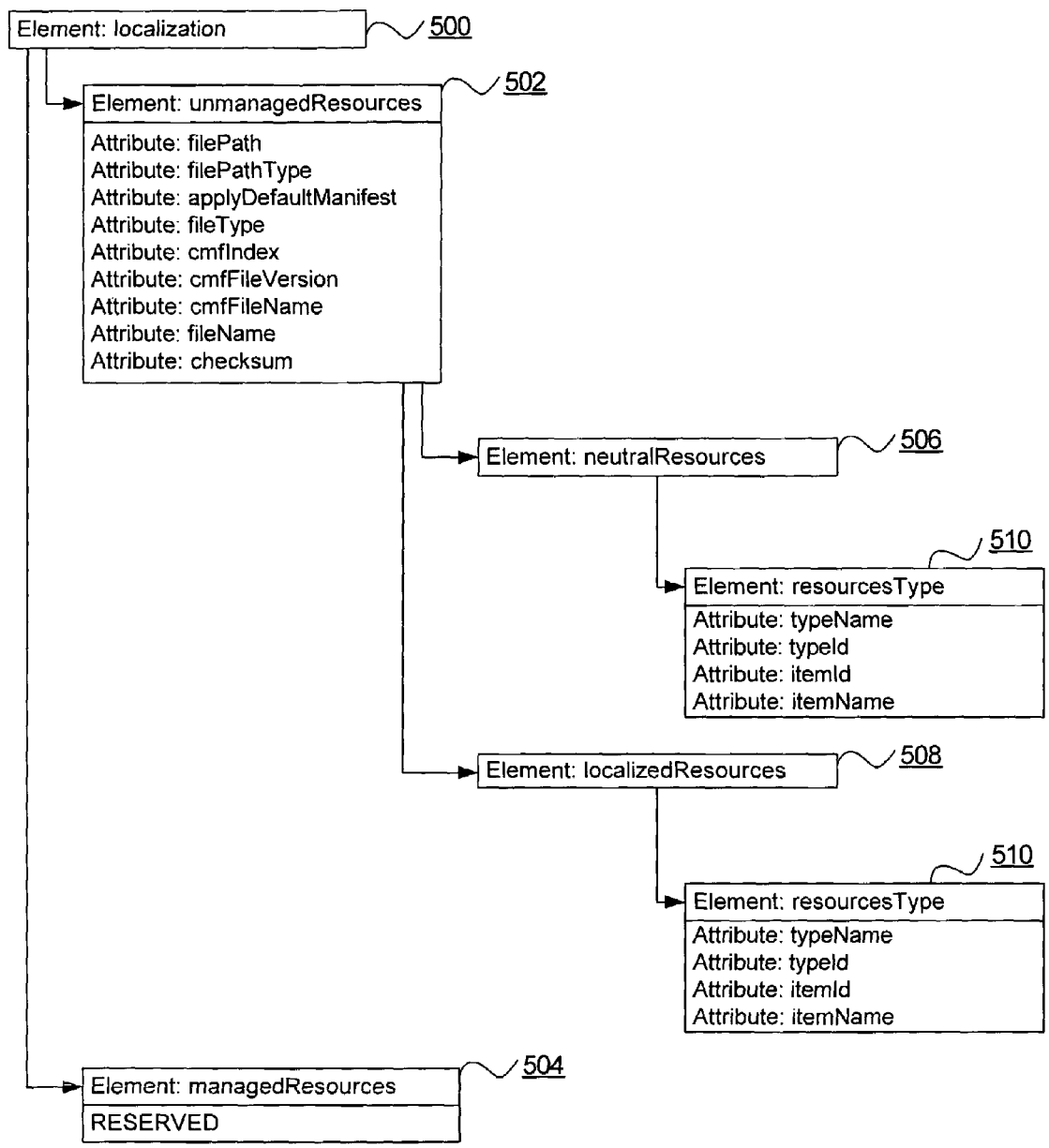
FIG. 5 is relationship diagram illustrating an exemplary structure of the resource manifest of the present invention.

Employing a resource manifest offers a number of advantages, primarily language independence (i.e., the resource manifest elements need not include localizable data or attributes). Additionally, using an XML based schema provides for open, efficient and flexible management and maintenance—developers are able to easily handle the resource manifest with the Notepad application or any XML editor as there is no need to use specialized tools. To define the manifest with maximum flexibility and efficiency, a description of an exemplary structured XML based schema follows along with an accompanying illustration in FIG. 5.

```
<ElementType typeId="localization">
    <element type="unmanagedResources" minOccurs="0"
       maxOccurs="1"/>
    <element type="managedResources" minOccurs="0" maxOccurs="1"/>
</ElementType>
```

The root element for the resource manifest is localization 500 and it preferably exists in every localized source code file and resource binary. The localization element simply contains major resource types with different architectures—managed and unmanaged. At the source level one manifest file can be shared by multiple components, so it may contain both unmanaged and managed resource descriptions. At the binary level it will usually be either unmanaged or managed.

```
<ElementType typeId="unmanagedResources">
    <attribute type="filePath" required="no"/>
    <attribute type="filePathType" required="no"/>
    <attribute type="applyDefaultManifest" required="no"/>
    <attribute type="fileType" required="no"/>
    <attribute type="cmfIndex" required="no"/>
    <attribute type="cmfFileVersion" required="no"/>
    <attribute type="cmfFileName" required="no"/>
    <element type="neutralResources" minOccurs="0" maxOccurs="1"/>
    <element type="localizedResources" minOccurs="1" maxOccurs="1"/>
</ElementType>
```

The beginning of the markup for unmanaged resources is unmanagedResources 502 (the element type managedResources 504 is reserved for managed resource types). All unmanaged resources can be described under the unmanagedResources 502 element and it contains basic localization information such as file path, folder type and version.

The filePath attribute specifies the localization file path. The resource loader can search this path for localization files before it performs the default search logic. The file path can be a full absolute file path or a relative path combined with pre-defined localized file paths (e.g., % SystemRoot %, % windir %, % CurrentDir %, % ProgramFiles %, % muiFallback %).

The filePathType attribute specifies the localization file folder organization convention. Both directory and file naming conventions are specified. Examples of directory conventions include: DIR_LANG_ID (classic Win32 language id), DIR_LANG_NAME (ISO 639 compliant language name) and DIR_LANG_CULTURE (RFC1766 compliant language culture name). In one preferred embodiment DIR_LANG_CULTURE is the default attribute. Choosing LANG_ NAME and LANG_CULTURE dictates the localization file search order on localized language folders (e.g., when LANG_NAME is specified, 'en' will be searched before 'en-us' for English, while LANG_CULTURE will search 'en-us' first). Examples of file naming conventions include: FILE_NAME_WIN32 (<filename>.<file extension>.mui) and FILE_NAME_MANAGED (<filename>.resources.dll).

The applyDefaultManifest attribute may contain values of 0 (no) or 1 (yes). In one preferred embodiment if applyDefaultManifest is not specified the value will be 1. When it is 1, resource types that are not specified in the component's manifest will be parsed with the default common resource manifest file.

The fileType attribute may contain values of 1 (localized), 2 (compacted localized format), 4 (system), and 8 (application). The system file type indicates that the component is a system file that matches resource languages with the system localization.

The cmfFileName attribute contains the file name of the compacted localized format file. The cmfIndex attribute contains the index value of the localization file inside the compacted localized format file. The cmfFileVersion attribute contains the compacted localized format file version.

The neutralResources element contains resource types information, which will be contained in the language neutral binary and the localizedResources contains resource types information, which will be contained in localized binary.

Several items bear noting. First, the localized resource binary and language neutral code binary share the same resource manifest file at source level. Some attributes and elements may only apply to one binary (e.g., filePath and filePathType only apply to the language neutral binary). Second, compacted localized format file attributes (i.e., cmfIndex, cmfFileVersion, and cmfFileName) will be used when fileType is CMF. In one preferred embodiment if fileType is not specified, the default type is non-CMF. Third, the post build process (covered in detail below) could overwrite a component's CMF information. CMF file version is a standalone version for the CMF file which could be independent of localized file versions. If necessary, the CMF file version can be replaced by public/private key for better security. Fourth, in one preferred embodiment when the applyDefaultManifest attribute is 1 and there are conflicts between the default manifest and the component's manifest, information inside the component's manifest will overwrite the default one.

```
<ElementType typeId="neutralResources">
    <attribute type="fileVer" required="no"/>
    <attribute type="checksum" required="no"/>
    <element type="resourcesType" minOccurs="0" maxOccurs="*"/>
</ElementType>
<ElementType typeId="localizedResources">
    <attribute type="fileVer" required="no"/>
    <attribute type ="checksum" required="no"/>
    <element type="resourcesType" minOccurs="0" maxOccurs="*"/>
</ElementType>
```

The neutralResources element 506 begins the description of resource items in the language neutral code binary. In one preferred embodiment if neutralResources is not used in the component's source manifest, its default value will be the rest of resource items not specified under the localizedResources. The fileVer and checksum attributes are not used in the source level. In neutral binaries neutralResources will contain real resource items, thus the fileVer and checksum attributes should have values. These values are generated by localization tools or the RC.exe complier during build time. It should be noted that if resource items under neutralResources and localizedResources conflict with each other, neutralResources will have higher priority or an error will be issued.

The fileVer attribute specifies the file version. To verify the localized file, the file version is relied on, but searching and loading the version can be costly so having this in the manifest improves performance. The checksum attribute specifies an MD5 traditional localization checksum. The checksum created is based on one of the resource types in the umnanagedResources/managedResources element. This attribute is hidden from the source level manifest and is only shown in the binary. The resourcesType element specifies the resource types.

In one preferred embodiment if localizedResources is used in the developer's source, the values should exist as resourcesType for localizable resource types or names. If localizedResources is used in the localized binary, its values are real resource items in the localized binary. Attributes fileVer and checksum should have values. These values are filled by localization tools in the build time (covered in detail below).

It bears noting that in one preferred embodiment if localizedResources is used in the developers' source and it has values of resourcesType and its values overlap those in neutralResources, only items from type in the neutral binary are extracted. Also, if the developer provides the resource manifest file, it should have at least one resourcesType element either in neutralResources or localizedResources.

```
<ElementType typeId="resourcesType">
    <attribute type="typeName" required="yes"/>
    <attribute type="typeId" required="yes"/>
    <attribute type="itemId" minOccurs="0" maxOccurs=1/>
    <attribute type="itemName" minOccurs="0" maxOccurs=1/>
</ElementType>
```

The resourceType element represents resource types and can be used multiple times. The typeName attribute specifies the string type. The typeId attribute specifies the id type. The itemName attribute specifies the resource item name strings. The itemId specifies the resource item ids.

It should be noted that only one entry of typeName and typeId is required. In one preferred embodiment when itemName and itemId contain multiple items, they should be separated by space characters.

Build-Time

Figure 6:
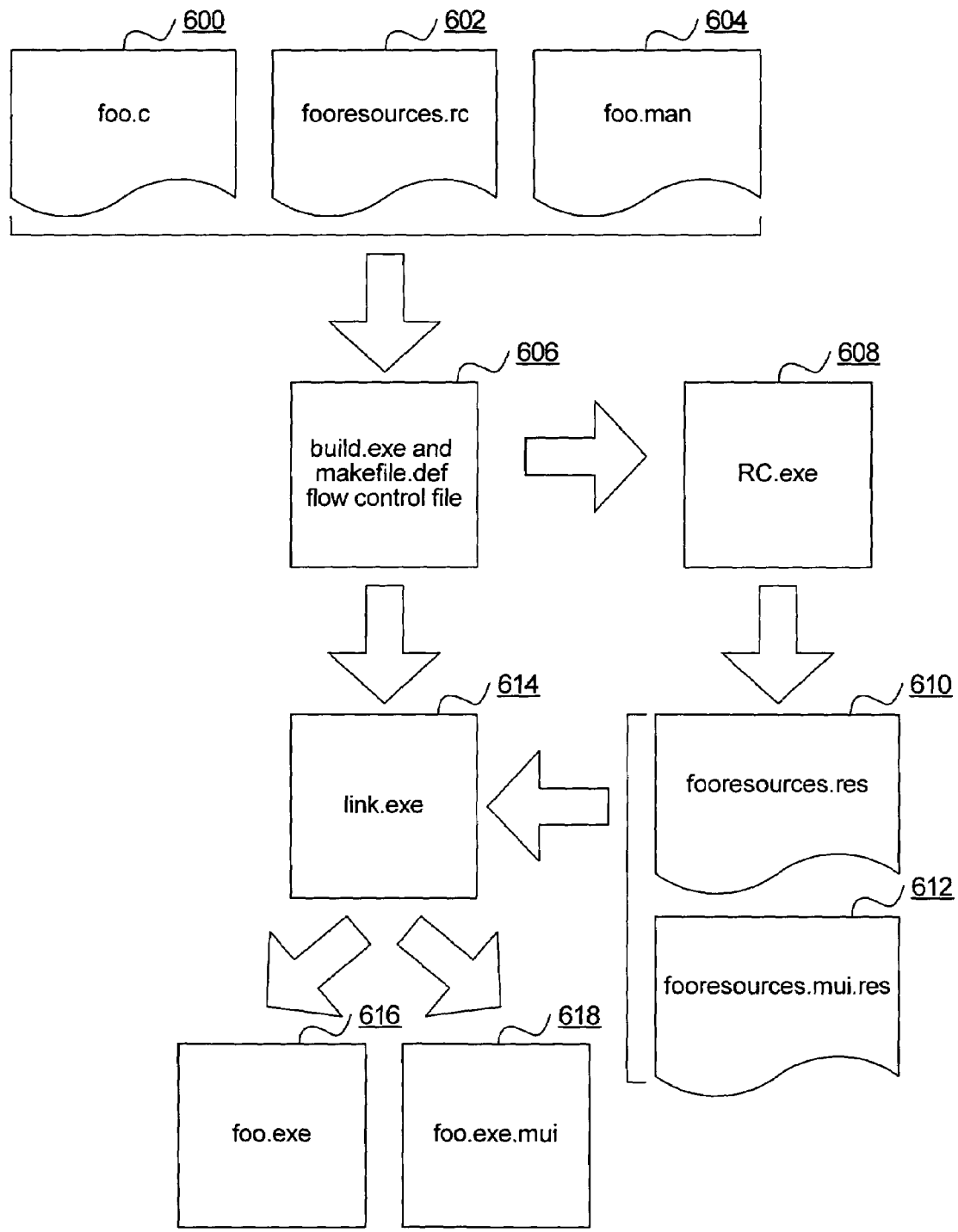
FIG. 6 is a schematic diagram illustrating the data flow according to an embodiment of the invention to create a language neutral code binary portion and a language dependent resource portion in a separate binary.
Figure 7:
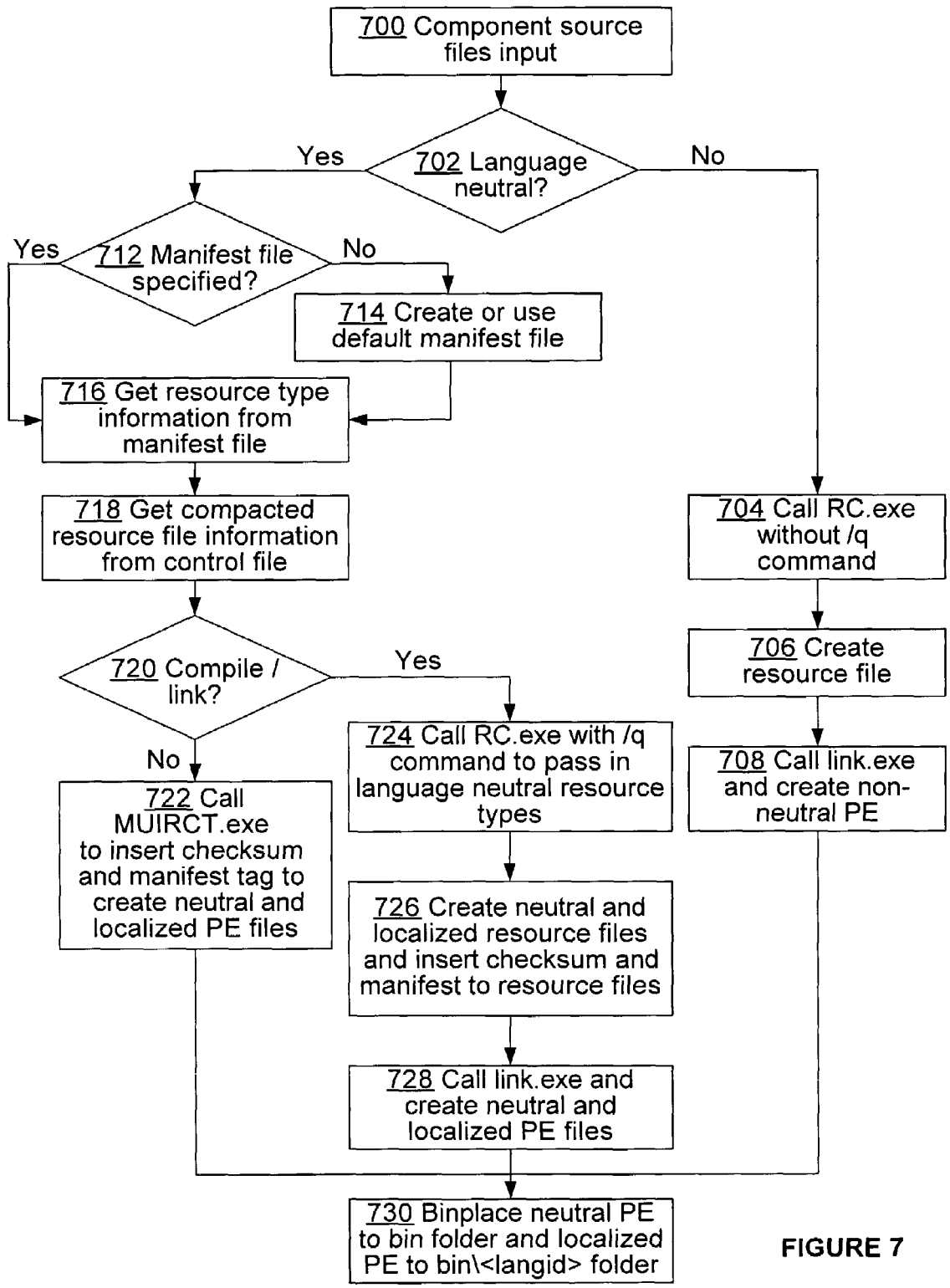
FIG. 7 is a flow chart illustrating steps taken according to an embodiment of the invention to create a language neutral code binary portion and a language dependent resource portion in a separate binary.

Turning to FIGS. 6 and 7 the process for building the language neutral binaries is illustrated. The build process begins at step 700 with the input of component source files 600, 602, 604 to the build utility (build.exe along with the makefile.def build flow control file) 606. Continuing with step 702 a determination is made by the build utility 606 as to whether or not this build is language neutral. In one preferred embodiment the build utility 606 can accept a parameter (e.g., LANG_NEUTRAL, not pictured) indicating whether the initiated build process is language neutral (i.e., LANG_NEUTRAL=1→language neutral build) or if it is not language neutral (i.e., LANG_NEUTRAL=0→non-language neutral build). If the language neutral parameter is not specified the default is a non-language neutral build.

If the build is not language neutral the build process continues in steps 704, 706, and 708. In step 704 the build utility 606 calls the resource compiler (RC.exe) 608. Next, in step 706 the resource compiler 608 creates the resource file (.res) 610. Finally, in step 708 the build utility 606 calls the linker utility (link.exe) 614 to create the non-language neutral PE file 616.

If on the other hand the build is specified as language neutral the build process continues in step 712 with a determination by the build utility 606 of whether a resource manifest file 604 has been specified. In one embodiment the build utility 606 can accept a parameter (e.g., RC_MANIFEST, not pictured) indicating the file name of the manifest 604. If the parameter is not specified, the default manifest file name will be used. If the manifest file 604 is found in the folder of sources 600, 602, then the build process continues at step 716. If the manifest file 604 is not found in the folder of sources 600, 602, the parent and grandparent folder of source files 600, 602, can be searched to see if a manifest file 604 exists.

If no manifest file 604 is found, the build utility 606 can create a default resource manifest file in step 714 before proceeding on to step 716.

Continuing with step 716 the build utility 606 obtains resource type information from the manifest file 604. In step 718 the build utility 606 can obtain resource file information from the compacted resource file if it is determined that the manifest file 604 indicates that such a resource compaction scheme is being leveraged. Proceeding to step 720 the build utility 606 makes a determination as to whether the source files 600, 602, 604 are to be compiled and linked.

If the source files 600, 602, 604 are not to be compiled and linked (i.e. they are existing binaries) the build utility 606 can call a localization resource compiling tool (MUIRCT.exe) to create neutral and localized PE files, and insert the resource manifest tag and checksum to both PE files.

If on the other hand the source files 600, 602, 604 are to be compiled and linked then the build process continues with step 724 where the build utility 606 calls the resource compiler (RC.exe) 608. In one embodiment the resource compiler 608 can be modified to accept a switch (e.g.,/q manifest_file_path, not pictured) indicating the name of the manifest file 604 which contains resources with types/names that will be complied into a separate resource (.res) files 610, 612. Accordingly, in step 726 the build utility 606 can then parse the component's source manifest file 604 and call the resource compiler (RC.exe) 608 to split localizable resources into neutral (.res) 610 and localized (.mui.res) 612 files according to the manifest resource type/name list in the manifest file 604. Additionally, the resource compiler (RC.exe) 608 updates the checksum attribute in the resources elements 506, 508 of the manifest file 604 and inserts manifest file 604 into both the neutral (.res) 610 and localized (.mui.res) 612 files. Finally, in step 728 the build utility 606 calls the linker utility (linke.exe) 614 twice to build two separate images —a language neutral image 616 and a language specific resource image 618.

The build process concludes in step 730 with the build utility 606 calling the binplace utility (binplace.exe) to place the neutral PE 616 in the bin folder and the localized PE 618 in the bin\<langid>folder.

Post-Build

Multiple individual resource files, such as language specific resource files, can be compacted into one or more compacted resource files, according to the structure described in detail above, by a post-build resource tool. Such a resource tool can either be an existing resource tool that can be modified to accept a switch that indicates the existence of a control file that can specify the groupings of resource files, or the resource tool can be new resource tool designed only to compact resource files.

A control file can specify the resource files to be grouped together and can specify the resulting compacted resource file. In one embodiment, the resource files to be grouped together and the resulting compacted resource file can be an ordered n-tuple, such that the last entry, or the first entry, is always the resulting compacted resource file, and the remaining entries and the resource files to be grouped together. Alternatively, the control file can rely on identifiers to specify the resource files to be grouped together and to specify the resulting compacted resource file. In either case, the control file need be nothing more than a simple text file, though as will be obvious to those skilled in the art, more complex data formats can also be used. To avoid the need for a myriad of control files, it is contemplated that a single control file can specify multiple groupings of resource files. In one embodiment, if the control file, due to error or otherwise, does not specify a resulting compacted file for one or more groups of resource files, the resource tool can bypass the compacting step for those resource files, and leave them uncompacted.

Figure 8:
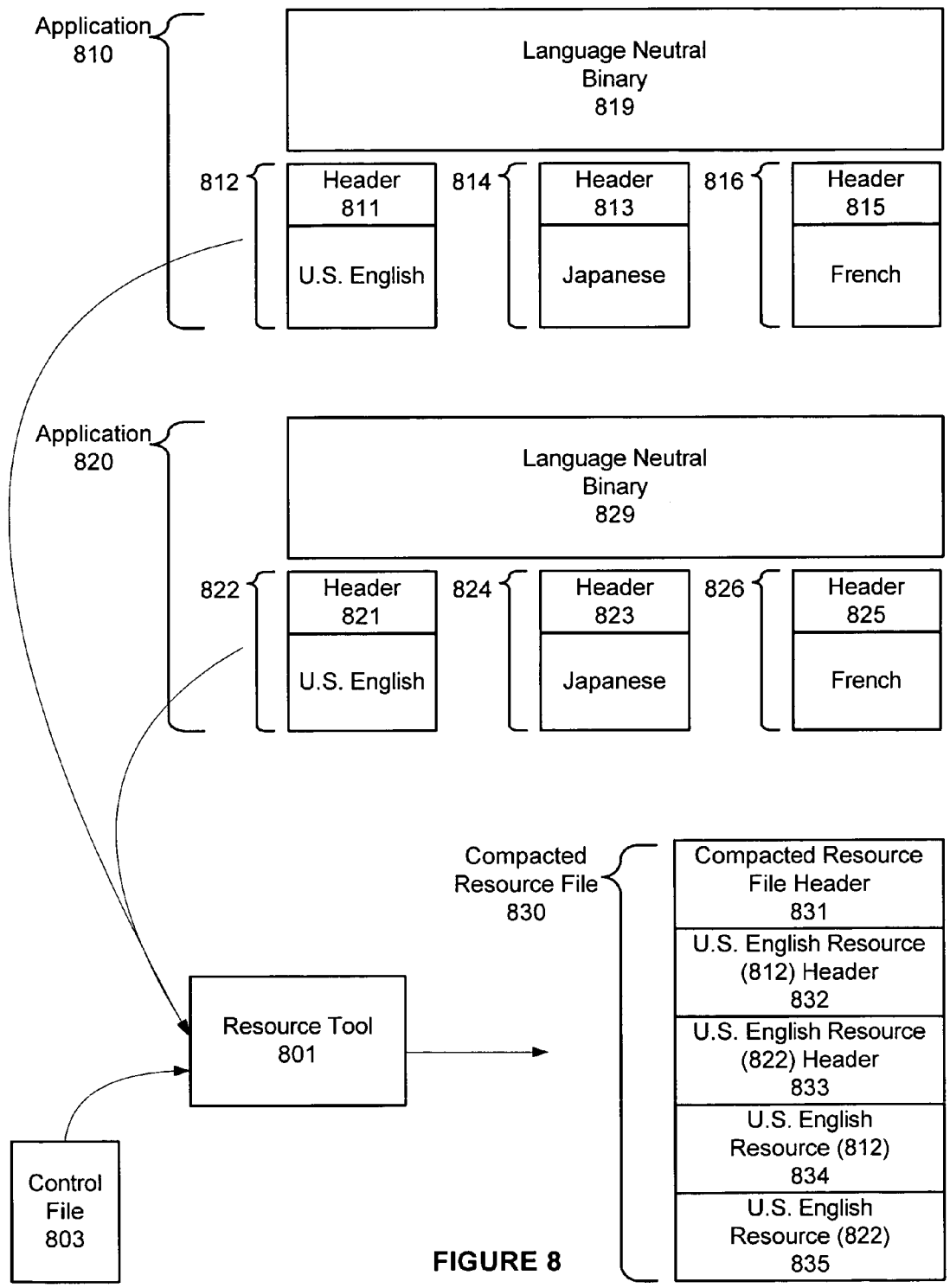
FIG. 8 is a schematic diagram illustrating the data flow according to an embodiment of the invention to load a language dependent resource at run-time.

Turning to FIG. 8, applications 810 and 820 are shown, which are analogous to application 301 shown in FIG. 3 and described in detail above. Applications 810 and 820 have a language neutral binary portion 819 and 829, respectively, and language dependent resource portions, 812, 814, and 816 for application 810 and 822, 824, and 826 for application 820. Each of the language dependent resources also contains a header, such as header 811 for the language dependent resource 812. The applications 810 and 820 can be the result of the build process described above, or they can be binary files derived from an unknown build process, such as can be received from a different company or group of developers.

A resource tool, such as resource tool 801 shown in FIG. 8, can accept input from a control file, such as control file 803, to compact the specified resources into a compacted resource file format. For example, the control file 803 can specify that the language specific resources of applications 810 and 820 can be combined such that the U.S. English resources are combined into one compacted resource file. Although not shown in FIG. 8, the control file 803 can also specify, for example, that the Japanese resources are to be combined into a second compacted resource file, and the French resources are to be combined into a third compacted resource file.

The resource tool can then read the U.S. English resources 812 and 822 of applications 810 and 820, respectively, and store the headers 811 and 821 as segments 832 and 833, respectively, of the compacted resource file 830. The remaining information from U.S. English resources 812 and 822 can be stored as segments 834 and 835, respectively, of the compacted resource file 830. As described above, segments 834 and 835 can contain the bulk of the resource data itself. If, as also described above, the compacted resource file 830 uses a format that requires the individual resource file headers to contain memory offset information, or other information not originally found in the header 811, such information can be added by the resource tool 801 at the time it creates compacted resource file 830.

Once the resource tool 801 has created segments 832, 833, 834, and 835 by reading, evaluating, and possibility editing or appending to the information contained in the resources 812 and 822, it can create a header 831 containing some or all of the information described above with reference to compacted resource file header 403. The resource tool 801 can then use similar methodology to create the compacted resource files which, in the present example, can be the files resulting from the compacting of the Japanese resources 814 and 824 and the French resources 816 and 826, as specified by the control file 803. Alternatively, the resource tool 801 can rely on known parallel processing techniques to create all of the specified compacted files at roughly the same time.

Run-Time

Because resources, such as language specific resources, can now be contained within a single file, there no longer exists a one-to-one mapping between the language specific resource and the language independent binary. The lack of a one-to-one mapping between the language specific resource and the language independent binary can complicate the instantiation of the language independent binary.

To better contrast run-time methodologies when no one-to-one mapping exists, consider the application 301, shown in FIG. 3, which does have a one-to-one mapping between each of the language specific binary files 305 and the language neutral binary 303. In such a case, each of the language specific binary files can be named, stored, or otherwise identified as relating only to the language neutral binary file 303. For example, a series of folders could be created bearing the titles or codes of the languages of the language specific files contained within the folders. Thus, there could exist a folder entitled "U.S. English", or "0404" that would contain all of the language specific binary files containing U.S. English data, such as the U.S. English resource pack 307 shown in FIG. 3. In this exemplary embodiment, each of the language specific binaries contained within the folders could be named to reflect their relationship to the language neutral binary. For example, if the language neutral binary was named "foo.exe", then the U.S. English language specific binary file could be called "foo.mui" and it could be stored in the U.S. English folder. In such a case, it is very simple to locate language specific resources because they are contained within predefined folders and are named in such a manner that their relationship to the language neutral binary is obvious.

Figure 9:
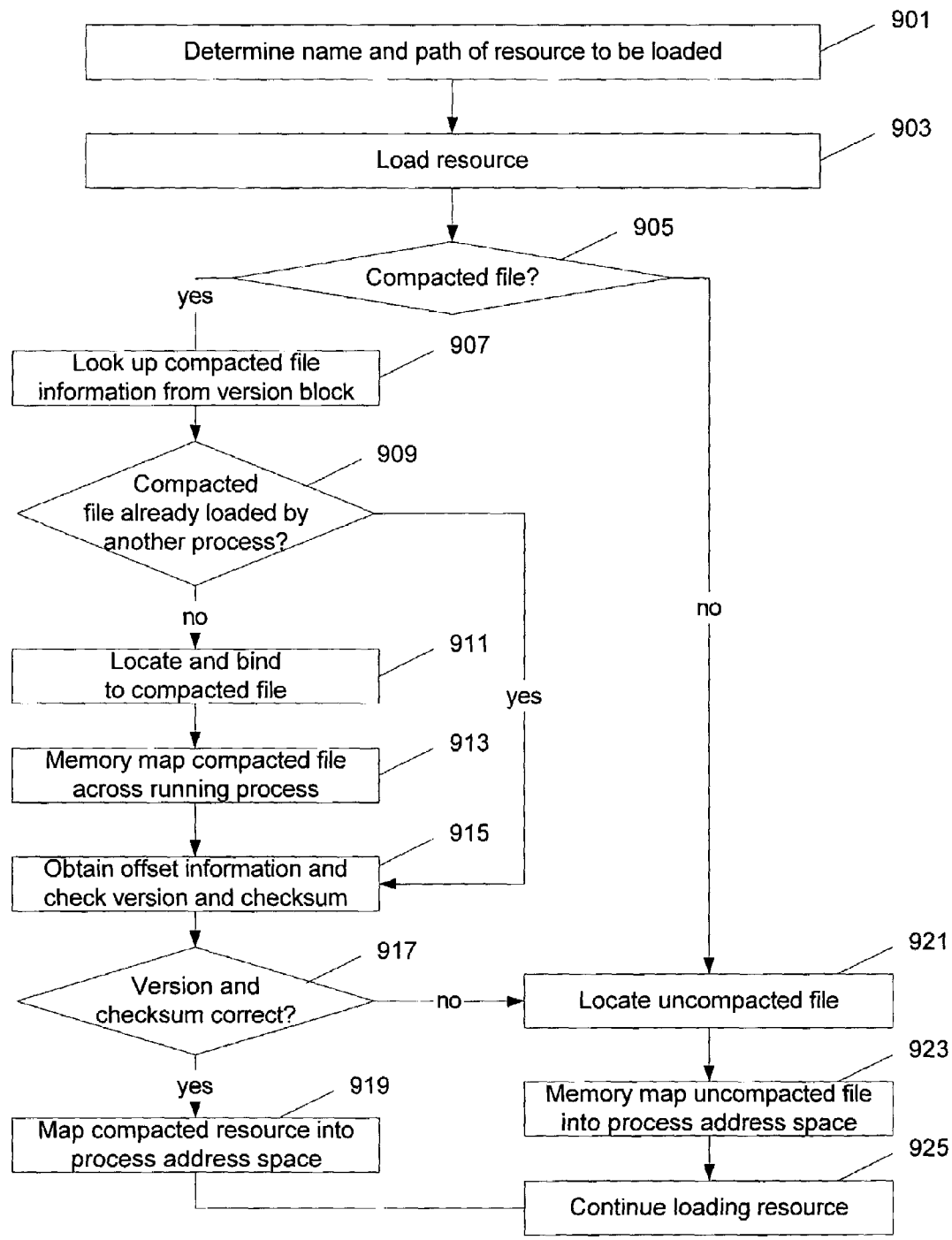
FIG. 9 is a flowchart illustrating steps taken according to an embodiment of the invention to load a language dependent resource at run-time.

As can be seen, however, the above process is not practical in situations where there is no one-to-one correspondence between the language neutral and language specific files. Consequently, a new loading process, designed to provide the efficiencies that are attendant with the compacted resource file design and were enumerated in greater detail above, is illustrated in FIG. 9. As will be understood by those skilled in the art, the steps illustrated in FIG. 9 can be performed by one or more components that load resources. Such components can be part of the operating system 35, various application programs, such as application program 36, or other software or utilities. Furthermore, as will also be known by those skilled in the art, the steps illustrated in FIG. 9 are generally performed because a component that is being instantiated, or otherwise loaded into memory, requires additional resources. As an example, the language neutral binary 303 of application 301 is likely to require the presence of at least one of the language specific binary files 305.

Returning to FIG. 9, step 901 indicates that a resource has been requested, and that the resource loading functions can determine the name and location, such as a path, of the resource to be loaded. As described in detail above, such information can be contained in a manifest that is stored with a component, such as a requesting component. Once the name and location of the resource to be loaded has been determined, the resource can be loaded at step 903, and the resource loading functions can determine, at step 905, if the resource is contained in a stand-alone file or if it is in a compacted file, possibility with additional resources that may or may not be currently requested. One method by which the loading functions can determine the type of file is to examine the header. As described in detail above, a compacted resource file header can contain a signature with a characteristic string that can be used to identify the type of file. In an alternative embodiment, the loading functions can perform the determination of step 905 prior to step 903 by, for example, examining the file name or other identifying information contained in the manifest stored with the requesting component in the manner described in detail above.

If, at step 905, the loading functions determine that the requested resource is not in a compacted file, the loading of that resource can proceed in a known manner. For example, if still necessary, the loading functions can locate the stand-alone or "uncompacted" file as shown in step 921. Subsequently, as shown in step 923, the loading functions can memory map the stand-alone file into the address space of the process that requested the resource to be loaded. Such a process might be an executing language neutral binary, such as binary 303, that requested a language specific resource. The requested resource, once it has been mapped into the requesting process's address space, can continue to be loaded at step 925, thereby providing its resources, such as language specific resources, to the requesting process.

However, if, at step 905, the loading functions determine that the requested resource is, in fact, a compacted file, then at step 907 the loading functions can reference the compacted file information from the version block of the requesting resource. As will be described in more detail below, the information contained in the version block of the requesting resource can be used to determine whether the correct resource file is contained in the compacted resource file.

At step 909, the loading functions can determine whether the compacted file has already been loaded by another process. As was described in detail above, efficiencies can be obtained by using compacted resource files because such files can reduce the number of file I/O operations. Consequently, to ensure that no unnecessary file I/O operations will be performed, the loading functions can first determine whether the compacted resource file was already loaded. One mechanism for performing the check of step 909 is to use a hash key that can be comprised of, for example, the full path name of the requested compacted file in combination with the language or language identifier of the requested language specific resources contained in the requested compacted file. Such a hash key can be compared to the hash key, similarly obtained, of the already loaded compacted resource file. If the two hash keys are equivalent, the requested compacted file has already been loaded. As will be known by those skilled in the art, numerous other methods exist for performing a check to determine whether the requested compacted resource file has already been loaded into memory. Such methods can include comparisons of the beginning bits of a file, file GUIDs, and the like, and can be equally used to perform step 909.

If step 909 determines that the requested compacted resource file has already been loaded into another process, the loading functions can perform step 915 and obtain the offset information of the requested resource, and can also obtain the version and checksum of the requested resource. As was described in detail above, the offset information can be contained in a variety of locations, including in the manifest that is part of the code that requested the resource, the header of the compacted resource file, and the individual resources themselves. Once the offset information is obtained, the loading functions can compare the version information and the checksum information of the resource located at the given offset with the requested version and the requested checksum, which, as described above, can be stored in the manifest.

If, at step 917, it is determined that the version and checksum information of the resource at the given offset do not match the requested version or checksum, the loading functions can revert to step 921 which, as described above, can be performed if it is determined that the requested resource is not in a compacted file. Thus, a failure to match either, or both, the version and checksum information can result in the loading functions resorting to known methods. However, if the version or checksum information, or both, are correct, the loading functions can proceed to step 919, at which the requested resource, which is compacted into the compacted resource file, is mapped into the process address space of the requesting process, and the loading of the resource can continue at step 925.

Returning to step 909, if the loading functions determine that the requested resource is in a compacted resource file that has not been previously loaded, the loading functions can locate and bind to the compacted resource file, as shown in step 911. To facilitate the sharing of resources, such as those contained in the same compacted resource file, the loading functions can memory map the compacted resource file across running processes as shown in step 913. Step 913 contemplates any of a variety of methods for sharing a file across processes, including creating and opening the compacted resource file in a memory paging area, and creating a permanent object. As will be known by those skilled in the art, when a file is shared by multiple processes, a counter can be maintained to ensure that access to the file is not terminated by one process while another process is accessing the file. In a similar manner, when the compacted resource file is shared, a counter or similar construct can be used to track the number of processes currently accessing the compacted resource file. Thus, while not specifically shown in FIG. 9, step 915 can include an increment of a counter tracking the usage of the compacted resource file by other processes.

As can be seen, the compacted resource file structure, and the resource manifest provide for an increase in efficiency by reducing the number of files, reducing the number of file I/O operations, and by decreasing wasted memory when such resource files are loaded. It will be appreciated that an improved operating system architecture and method of producing, installing, and using the improved operating system architecture have been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for creating language-neutral and corresponding language-specific resource files for a component, the method comprising:

obtaining a resource manifest file;

retrieving a resource file by accessing the resource manifest file;

creating a language-neutral file and a language-specific resource file for the retrieved resource file, the language-specific resource file having a plurality of language-specific resources, the language neutral file and the language-specific resource file being created by reading localizable resource information contained in the resource manifest file, the localizable resource information specifying locations of specific resources to be retrieved during runtime from the language-specific resource file, the locations of the specific resources being mapped to resource identifiers used by applications to identify the specific resources within the language-specific resource file, in the resource manifest file, the resource manifest file further specifying a type of resource to be retrieved, and indicating whether the resource is localizable;

creating a checksum data;

updating a field in the resource manifest file with the checksum data; and the language-neutral file and language-specific resource file being created by splitting localizable resources identified by the localizable resource information into neutral and localized files, and by creating a language-neutral image and a language-specific image of the retrieved resource file.

2. The method of claim 1 wherein the resource manifest file is specified.

3. The method of claim 1 wherein the resource manifest file is not specified and a default resource manifest file is used.

4. The method of claim 1 wherein the resource manifest file is an Extensible Markup Language (XML) based declarative file.

5. The method of claim 1 wherein the localizable resource information resides in a compacted resource file.

6. The method of claim 1 wherein creating comprises:
reading the localizable resource information from the resource manifest file, by reading a plurality of data fields comprising:
a first data field containing data representing an element indicating the schema contains resource localization information;
a second data field containing data representing an element associated with a user interface resource;
a third data field containing data representing language dependency of the user interface resource element of the second data field; and
a fourth data field containing data representing an element associated with a user interface resource type.

7. The method of claim 6 wherein the second data field represents unmanaged resources.

8. The method of claim 6 wherein the second data field represents managed resources.

9. The method of claim 1 wherein the third data field represents language-neutral resources.

10. The method of claim 1 wherein the third data field represents localized resources.

11. The method of claim 1, wherein reading the plurality of fields comprises reading:
a fifth data field containing data representing a file path of a resource file of the user interface resource element of the second data field;
a sixth data field containing data representing a file path type of the file path; and
a seventh data field containing data representing a file type of the resource file.

12. The method of claim 1, wherein reading the plurality of fields further comprises reading an eighth data field containing data representing an indication of whether to reference a default resource manifest.

13. The method of claim 1, wherein reading the plurality of fields further comprises reading:
a ninth data field containing data representing a file name of a compacted resource file;
a tenth data field containing data representing a file version of the compacted resource file; and
an eleventh data field containing data representing an index value of a resource localization file within the compacted resource file.

14. The method of claim 1, wherein reading the plurality of fields further comprises reading:
a twelfth data field containing data representing a file version of a resource file; and
a thirteenth data field containing data representing a checksum value.

15. The method of claim 1, wherein reading the plurality of fields further comprises reading:
a fourteenth data field containing data representing a name of the element associated with the user interface resource type of the fourth data field;
a fifteenth data field containing data representing an identifier of the element associated with the user interface resource type of the fourth data field;
a sixteenth data field containing data representing a name of a resource item; and
a seventeenth data field containing data representing an identifier of the resource item.

16. The method of claim 1 wherein the plurality of fields are in a schema that comprises an Extensible Markup Language (XML) based declarative file.

* * * * *

UNITED STATES PATENT AND TRADEMARK OFFICE
CERTIFICATE OF CORRECTION

PATENT NO. : 7,516,442 B2  Page 1 of 1
APPLICATION NO. : 10/692049
DATED : April 7, 2009
INVENTOR(S) : Wei Wu et al.

It is certified that error appears in the above-identified patent and that said Letters Patent is hereby corrected as shown below:

In column 19, line 31, in Claim 9, delete "claim 1" and insert -- claim 6 --, therefor.

In column 19, line 33, in Claim 10, delete "claim 1" and insert -- claim 6 --, therefor.

In column 19, line 35, in Claim 11, delete "claim 1," and insert -- claim 6, --, therefor.

In column 20, line 5, in Claim 12, delete "claim 1," and insert -- claim 6, --, therefor.

In column 20, line 9, in Claim 13, delete "claim 1," and insert -- claim 6, --, therefor.

In column 20, line 18, in Claim 14, delete "claim 1," and insert -- claim 6, --, therefor, In column 20, line 24, in Claim 15, delete "claim 1," and insert -- claim 6, --, therefor.

In column 20, line 36, in Claim 16, delete "claim 1" and insert -- claim 6 --, therefor.

Signed and Sealed this
Third Day of May, 2011

David J. Kappos
*Director of the United States Patent and Trademark Office*